(12) United States Patent
Rossotto

(10) Patent No.: US 8,442,740 B2
(45) Date of Patent: May 14, 2013

(54) PASSING FROM A NON-SYNCHRONIZED STATE BETWEEN AN ENGINE AND A ROTOR TO A SYNCHRONIZED STATE

(75) Inventor: Régis Rossotto, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 13/440,122

(22) Filed: Apr. 5, 2012

(65) Prior Publication Data

US 2012/0277969 A1 Nov. 1, 2012

(30) Foreign Application Priority Data

Apr. 29, 2011 (FR) ...................................... 11 01327

(51) Int. Cl.
*B64C 11/00* (2006.01)
(52) U.S. Cl.
USPC .............................. 701/100; 244/6; 244/17.11
(58) Field of Classification Search ........... 244/6, 17.11, 244/53 R, 61, 200.1, 204.1; 60/244, 263, 60/275, 39.12, 39.13, 39.281, 39.282, 39.34, 60/39.37, 39.42, 39.43, 39.44, 626, 804; 701/100; 180/242, 301, 310
See application file for complete search history.

(56) References Cited

U.S. PATENT DOCUMENTS

| | | | |
|---|---|---|---|
| 4,466,526 A | 8/1984 | Howlett | |
| 5,020,316 A | 6/1991 | Sweet | |
| 5,046,923 A * | 9/1991 | Parsons et al. .................. | 416/30 |
| 2004/0035978 A1* | 2/2004 | Almeras ........................... | 244/6 |
| 2009/0048722 A1* | 2/2009 | Piasecki et al. .................. | 701/3 |
| 2010/0310371 A1* | 12/2010 | Eglin ................................ | 416/1 |

FOREIGN PATENT DOCUMENTS

| | | |
|---|---|---|
| EP | 0093684 A | 9/1983 |
| EP | 0398839 A2 | 11/1990 |

OTHER PUBLICATIONS

Search Report and Written Opinion; Application No. FR 1101327; dated Feb. 20, 2012.

* cited by examiner

*Primary Examiner* — Mary Cheung
*Assistant Examiner* — Atul Trivedi
(74) *Attorney, Agent, or Firm* — Brooks Kushman P.C.

(57) ABSTRACT

In order to regulate a power plant (105) having a gas generator (1) and a free turbine (3) to drive a rotary wing, a first speed of rotation (NTL) of the free turbine (3) is regulated on a first setpoint value (NTL*) equal either to a regulation term (NRc) or to a predetermined setpoint threshold (NTL*). The regulation term (NRc) is a function of a third speed of rotation (NR) of said rotary wing in accordance, where NRc=NR*(1−d), "d" representing a non-zero constant lying in the range 0 to 1.

15 Claims, 3 Drawing Sheets

US 8,442,740 B2

PASSING FROM A NON-SYNCHRONIZED STATE BETWEEN AN ENGINE AND A ROTOR TO A SYNCHRONIZED STATE

CROSS REFERENCE TO RELATED APPLICATION

This application claims priority to French patent application no. FR 11 01327 filed on Apr. 29, 2011, the disclosure of which is incorporated in its entirety by reference herein.

BACKGROUND OF THE INVENTION (1) Field of the Invention

The present application stems from French patent application FR 11/01327 filed on Apr. 29, 2011, the content of which is incorporated herein.

The invention relates to the general field of regulating the engines of an aircraft, in particular of a rotary wing aircraft.

(2) Description of Related Art

This type of aircraft generally has at least one rotor for providing lift and possibly also propulsion, which rotor has a plurality of variable-pitch blades, and the aircraft also has a power plant of the type comprising an engine driving the main rotor in rotation by means of a main gearbox known under the acronym MGB.

Such an engine may be a free turbine turboshaft engine having a gas generator followed by at least one free turbine that is secured to an outlet shaft of the engine, the outlet shaft being suitable for driving the main gearbox of an aircraft.

Furthermore, one overrunning clutch or "free-wheel" per engine is generally arranged between the engine and the main gearbox, in particular for the purpose of preventing a mechanical blockage of the engine giving rise to a blockage of the main gearbox and consequently to a blockage of the main rotor of the rotary wing.

Conventionally, the free-wheel thus has a driving portion suitable for rotating a driven portion of the free-wheel. The driving portion of the free-wheel is then connected to the engine, while the driven portion of the free-wheel is connected to the main gearbox.

The term "synchronization" is used to designate a first operating state in which the engine drives the rotary wing, the driving portion of the free-wheel engaging the driven portion of the free-wheel.

Conversely, the term "desynchronization" relates to a second operating state in which the engine is not driving the rotary wing, the driven portion of the free-wheel not engaging the driving portion of the free-wheel.

In another aspect, the engine is fitted with a regulator system having the main function of using the fuel flow rate to control the power that is delivered by the engine. The regulator system may seek to maintain the speed of rotation of the main rotor of a helicopter at a value that is substantially constant, by maintaining the speed of rotation of a gas generator of the engine below a predetermined threshold, for example.

A helicopter is piloted in particular by acting on the pitch of the blades of the main rotor.

An increase in pitch tends to cause the main rotor to decelerate, the increase in pitch giving rise to an increase in the lift from the main rotor and also to an increase in its aerodynamic drag. In order to avoid the speed of rotation being reduced excessively, the power generated by the engine must therefore increase so as to keep the speed of rotation of the main rotor at the desired speed. Similarly, when the pitch of the blades is decreased, it is necessary to decrease the power delivered by the engine so that the speed of rotation of the main rotor does not exceed the limit set by the manufacturer.

Furthermore, the regulation of the fuel flow rate must be controlled scrupulously since any increase in the fuel flow rate must be controlled in particular to enable the rotary wing to absorb more power, but without running the risk of the engine pumping. "Pumping" is a phenomenon that affects the gas generator of an engine when, locally, an excessive angle of incidence of a blade or a vane gives rise to aerodynamic separation, thereby considerably reducing the flow rate of air. One consequence of this phenomenon is overheating in the combustion chamber of the engine, which can lead to damage to a turbine of the engine.

Likewise, decelerating the engine and reducing the fuel flow rate must also be controlled so as to avoid engine flame-out.

For example, on a helicopter there are various types of regulation with the purpose of constantly bringing the speed of rotation of the free turbine towards a predefined first setpoint value.

One known type of regulation is proportional-integral regulation with power anticipation based on the collective pitch of the blades of the main rotor. That type of regulation seeks to maintain the speed of rotation of the free turbine substantially equal to the regulation first setpoint value. Under such circumstances, a computer makes use of information from sensors for sensing the speed of rotation of the free turbine.

For example, sensors measure the first speed of rotation NTL of the free turbine of the engine. Under such circumstances, a first setpoint value, corresponding to the value that the first speed of rotation NTL ought to have in order to ensure that the speed of rotation of the rotor is ideal, is a value that is set by the manufacturer.

As a result, if the first speed of rotation NTL is different from this first setpoint value, the computer accelerates or decelerates the engine in order to obtain the ideal speed of rotation for the main rotor.

Under such conditions, the computer determines a second setpoint value by making use of anticipation relationships based on the collective pitch of the blades of the main rotor. This second setpoint value corresponds to the value that the second speed of rotation NG of the gas generator of the engine ought to reach in order to ensure that the first speed of rotation NTL is equal to the first setpoint value.

Reference may be made to the literature in order to obtain information about proportional-integral regulation with power anticipation.

The present invention relates more particularly to regulating transients in such an engine in the event of the pilot performing a severe maneuver, i.e. in the event of a fast and substantial variation in the collective pitch of the blades.

Following a large and fast drop in the collective pitch, the speed of rotation of the rotary wing increases significantly. Under such circumstances, the engine and the main gearbox lose synchronization during a transient period of autorotation, with the corresponding speed of rotation of the driving portion of the free-wheel becoming less than the speed of rotation of the driven portion of the free-wheel.

However, when the pilot increases the collective pitch once more, power anticipation enables the engine to be accelerated so as to respond in the most satisfactory possible manner to the power requirement of the main rotor.

Conversely, the third speed of rotation NR of the main rotor drops suddenly as a result of the increase in collective pitch, thereby leading to an increase in the drag of said main rotor.

As a result, the speed of rotation of the driving portion of the free-wheel arranged between the engine and the main gearbox increases, whereas on the contrary the speed of rotation of the driven portion of the free-wheel drops.

The first state of operation corresponding to synchronized operation is finally achieved when the driven portion engages the driving portion. The helicopter then ceases to be flying in autorotation.

Nevertheless, the resynchronization takes place suddenly. The free-wheel is subjected to an impact at the moment of resynchronization, associated with the acceleration difference between the main rotor and the free turbine of the engine.

Furthermore, it should be observed that the third speed of rotation of rotary wing drops below its nominal value for the length of time needed by the engine to return to delivering sufficient power to enable it to drive the rotary wing.

Among known types of regulation, mention may be made of several documents.

Document EP 0 093 684 describes making use of the difference between the speed of rotation of the main rotor and the speed of rotation of the free turbine in order to determine when there is a state of autorotation. During such autorotation, the deceleration of the main rotor is used for controlling the flow rate of fuel to the engine.

By way of example, document U.S. Pat. No. 5,046,923 describes regulation that is based on an algorithm that takes account of the speed of rotation of the main rotor, of the speed of rotation of the engine, and, where appropriate, of the engine torque, in order to determine when there is a state of autorotation. Once the above-mentioned autorotation state is recognized, a speed of rotation setpoint for the gas generator of the engine is calculated, as is a setpoint for the fuel flow rate.

Document EP 0 398 839 describes automatic control of the fuel feed to a free turbine helicopter engine. By comparing the speed of the main rotor with the speed of the free turbine, various setpoints are applied. Taking account of the acceleration of the rotor serves to control an anticipation setpoint for the speed NG (where NG is the speed of rotation of the gas generator). Mention is also made of the possibility of also making use of the torque delivered by the engine.

BRIEF SUMMARY OF THE INVENTION

The present invention is defined by the claims. It provides a regulation method and an associated device for at least one aeroengine in order to reduce impacts in the free-wheel during resynchronization of the engine and the main gearbox.

The objects given to the invention are achieved with the help of a method of regulating a power plant having a gas generator and a free turbine in a rotary wing aircraft, the method consisting in:

using a measured value of the first speed of rotation of the free turbine to cause said first speed of rotation to tend towards a first setpoint value by controlling a second speed of rotation of said gas generator by means of a second setpoint value;

monitoring the variation in the position of the collective pitch of the blades of the rotary wing and, as a function of said variation, temporarily anticipating the power demand of the rotary wing by correcting the second setpoint value.

The state of the art sometimes consists in using a first setpoint value as predetermined by the manufacturer. Unlike that, the method of the invention is remarkable in particular in that it consists in:

reading the current value of the third speed of rotation NR of the rotary wing, using first measurement means delivering said current value to a computer during a regular period, for example;

calculating a regulation term that is a function of the third speed of rotation by using the following relationship:

$$NRc = NR*(1-d)$$

where "NRc" represents said regulation term, "NR" represents said third speed of rotation, and "d" represents a non-zero constant lying in the range 0 to 1 (i.e. $0 < d \leq 1$), "*" representing the multiplication sign, and "−" representing the subtraction sign;

comparing the values of this regulation term and of a predetermined setpoint threshold for the first speed of rotation of the free turbine; and regulating the speed of the free turbine on a first setpoint value equal either to said regulation term or to said setpoint threshold as a function of predetermined conditions.

It can thus be seen that the first speed of rotation of the free turbine is then regulated either using a setpoint threshold, e.g. corresponding to the setpoint used in certain methods of the prior art, or else by using the regulation term that is a function of the third speed of rotation NR.

More precisely, when the power plant drives a main rotor via a free-wheel, during a first state of operation in which the power plant and the main rotor are synchronized, it is the setpoint threshold that is used. Conversely, when the power plant is no longer driving the main rotor during a second state of operation, it is the regulation term that is used.

In an implementation in accordance with the invention, the method consists in using a constant d that preferably lies in the range 0.005 to 0.1, and more preferably is equal to 0.01.

In a preferred first implementation, the speed of the free turbine is regulated on a first setpoint value equal to the regulation term when the regulation term is greater than the setpoint threshold, and the speed of the free turbine is regulated on a first setpoint value equal to the setpoint threshold when the setpoint threshold is greater than said regulation term.

It can be seen that there is no need to determine whether the aircraft is operating in the first or the second mode of operation.

In a second implementation, if the third speed of rotation is less than the sum of the first speed of rotation of the free turbine plus a first predetermined invariant, and if the time derivative of the third speed of rotation is greater than a second invariant, then the speed of rotation of the free turbine is regulated on a first setpoint value equal to said regulation term, said regulation otherwise being performed on the basis of the setpoint threshold.

The first and second variants are determined by the manufacturer, in particular by testing. These first and second invariants depend in particular on the inertia of the main rotor and on the capacity of the power plant for acceleration.

In an implementation in accordance with the invention, the setpoint value for the second speed of rotation of the gas generator of the power plant is determined by means of proportional-integral regulation.

In an implementation in accordance with the invention, the method consists in using a computer of the power plant to implement the steps making up the method.

In an implementation in accordance with the invention, the method consists in using a computer of the avionics system of the aircraft.

The method in accordance with the invention may be applied for example to an aircraft, of the rotorcraft or helicopter kind, in which the power plant is connected to the rotary wing via a main gearbox and a free-wheel mechanism. The power plant may have one or more engines.

An advantage of the method of the invention lies in the fact that it serves in particular to reduce the impacts to which a free-wheel in the transmission system is subjected whenever the engine and the main gearbox become resynchronized during severe maneuvers on the part of the pilot. With conventional prior art regulation systems, such impacts are generated at the moment that the main gearbox re-engages. Such impacts can lead to premature aging of various mechanical parts.

Another advantage of the method in accordance with the invention lies in the main rotor decelerating during severe maneuvers in a manner that is less marked than in the prior art. The aircraft, e.g. a helicopter, is thus more reactive than in the prior art.

The method in accordance with the invention makes it possible to optimize the return to drawing power at the end of a stage of autorotation without it being necessary to detect either the occurrence of autorotation or the end of autorotation. The method in accordance with the invention thus enables a setpoint relationship for the free turbine to be provided that is valid regardless of the state of the aircraft (regardless of whether or not it is in autorotation).

In addition to a method, the invention also provides a regulator device for regulating a power plant of a rotary wing aircraft, the power plant being provided with a gas generator and a free turbine, said regulator device comprising a computer provided with a processor and a memory containing instructions, the instructions enabling the processor to perform the following operations:

using the measured value of the first speed of rotation to cause this first speed of rotation to tend towards a first setpoint value by controlling a second speed of rotation of the gas generator by means of a second setpoint value; and determining how the collective pitch of the blades of the rotary wing is varying, and as a function of said variation, the processor temporarily anticipates the power demand of the rotary wing by correcting the second setpoint value.

In addition:

the processor determines the current value of the third speed of rotation of the rotary wing;

the processor calculates a regulation term that is a function of the third speed of rotation by using the following relationship:

$$NRc = NR*(1-d)$$

where "NRc" represents said regulation term, "NR" represents said third speed of rotation, and "d" represents a non-zero constant lying in the range 0 to 1;

the processor compares the values of said regulation term and of a predetermined setpoint threshold of the first speed of rotation of the free turbine; and the processor regulates the speed of the free turbine on a first setpoint value that is equal either to said regulation term or else to said setpoint threshold, as a function of predetermined conditions.

BRIEF DESCRIPTION OF THE SEVERAL VIEWS OF THE DRAWINGS

The invention and its advantages appear in greater detail from the following description of an embodiment given by way of non-limiting illustration and with reference to the accompanying figures, in which.

Elements that are functionally and structurally identical and present in more than one of the figures are given the same numerical or alphanumerical references in each of them.

DETAILED DESCRIPTION OF THE INVENTION

Figure 1:
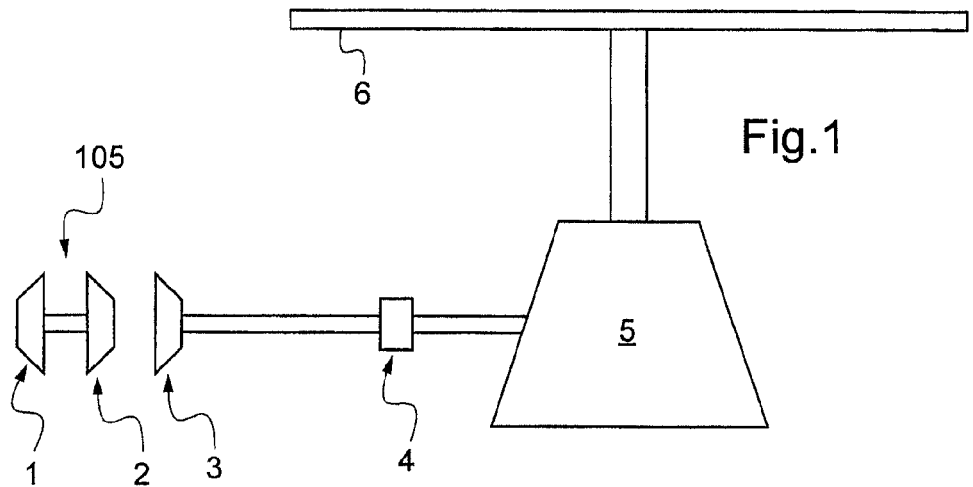
FIG. 1 is a diagrammatic view of an embodiment of a mechanical connection between a rotor and an engine in which the method in accordance with the invention is implemented.

FIG. 1 is a diagram of a mechanical transmission system of a helicopter to which the method in accordance with the invention is applied.

The transmission system comprises a power plant 105 including in particular a gas generator having a compressor 1, and a high pressure turbine 2, also known as a linked turbine.

A stream of gas delivered by the high pressure turbine 2 sets the free turbine 3 of the power plant into rotation. Thus, the free turbine 3 rotates at a first speed of rotation NTL, while the gas generator and in particular its compressor rotate at a second speed of rotation NG.

In addition, the free turbine 3 is connected to a main gearbox 5 via an overrunning clutch mechanism 4, referred to more simply as a free-wheel 4.

The main gearbox 5 rotates a rotary wing at a third speed of rotation NR, the rotary wing being provided with a main lift rotor 6 having a plurality of blades.

Figure 2:
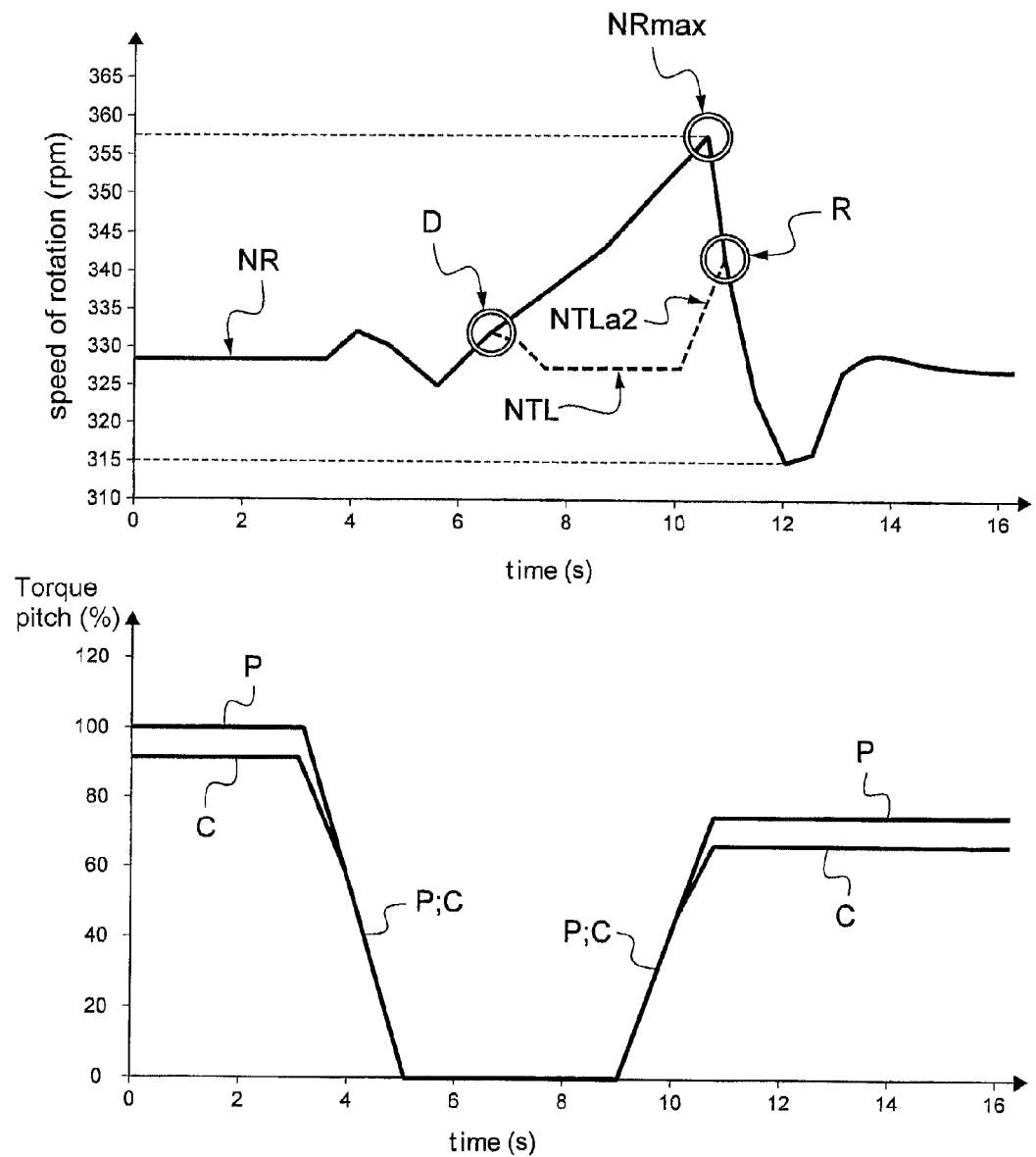
FIG. 2 shows an example of how the speeds of rotation of a rotor and of a free turbine may vary in the prior art.

FIG. 2 gives an example of how the third speed of rotation NR of the main rotor 6 and the first speed of rotation NTL of the free turbine 3 vary in the prior art as a function of a variation in the collective pitch P of the blades of the rotary wing. The modification to this collective pitch P of the blades of the rotary wing is represented as a function of time in the lower graph. The same applies for the transmitted torque C.

The upper graph in FIG. 2 shows a point D corresponding to the instant when the main rotor 6 and the free turbine 3 lose synchronization as a result of a rapid and substantial reduction in the collective pitch P of the blades of the rotary wing. While synchronization is lost, a computer regulates the first speed of rotation NTL on the basis of a predetermined setpoint.

The third speed of rotation NR of the main rotor increases up to a maximum value represented by the point NRmax, prior to falling off once more. The power anticipation of the main rotor 6 is represented by a large transient increase in the first speed of rotation NTL. This anticipation is shown by the portion NTLa towards the end of the stage in which synchronization is lost.

When a driven portion of the free-wheel 4 connected to the free turbine rotates at the same speed of rotation as a driving portion of the free-wheel 4 connected to the main gearbox 5, the main rotor 6 and the free turbine 3 become synchronous once more. The changeover from a second state of operation that is not synchronized to a first stage of operation that is synchronized gives rise in particular to a jolt in the free-wheel 4. Resynchronization occurs at the point R in the speed curves.

After resynchronization, the motor needs to oppose the aerodynamic resistance and the inertia of the resynchronized main rotor 6. This results in a transient drop in the third speed of rotation NR, e.g. from a nominal value of 328 revolutions per minute (rpm) to a value of 315 rpm. Thereafter the third speed of rotation NR tends to rise and stabilize once more on the nominal value.

By way of example, the lower graph shows a modification to the collective pitch P of the blades of the rotary wing, in which they can change rapidly from a 100% position to a 0% position, referred to respectively as "full coarse pitch" and "full fine pitch".

In one implementation, the method of the invention for regulating a power plant of a rotary wing aircraft consists in using the measured value of the first speed of rotation NTL of the free turbine to control the second speed of rotation NG by using a second setpoint in such a manner as to regulate the first speed of rotation NTL of the free turbine on a predetermined setpoint value NTL*.

Thereafter, the method consists in monitoring the variation in the position of the collective pitch P of the blades of the rotary wing, and, as a function of the amplitude of said variation, in temporarily anticipating the power demand from the rotary wing by correcting the value of the setpoint for the speed of rotation of the power plant NG*.

In the method in accordance with the invention, the current value of the speed of rotation of the main rotor 6 of the rotary wing is read.

Under such circumstances, a regulation term NRc is calculated as a function of the third speed of rotation NR using the following relationship:

$$NRc = NR*(1-d)$$

where "NRc" represents said regulation term, "NR" represents the third speed of rotation, and "d" represents a constant lying in the range 0 to 1 (i.e. $0 < d \leq 1$).

Thereafter, the values of this regulation term is compared with a predetermined setpoint threshold NTL' for the first speed of rotation NTL of the free turbine.

The speed NTL of the free turbine is then regulated using a first setpoint value equal either to the regulation term NRc or else to the setpoint threshold NTL', as a function of predetermined conditions.

Figure 3:
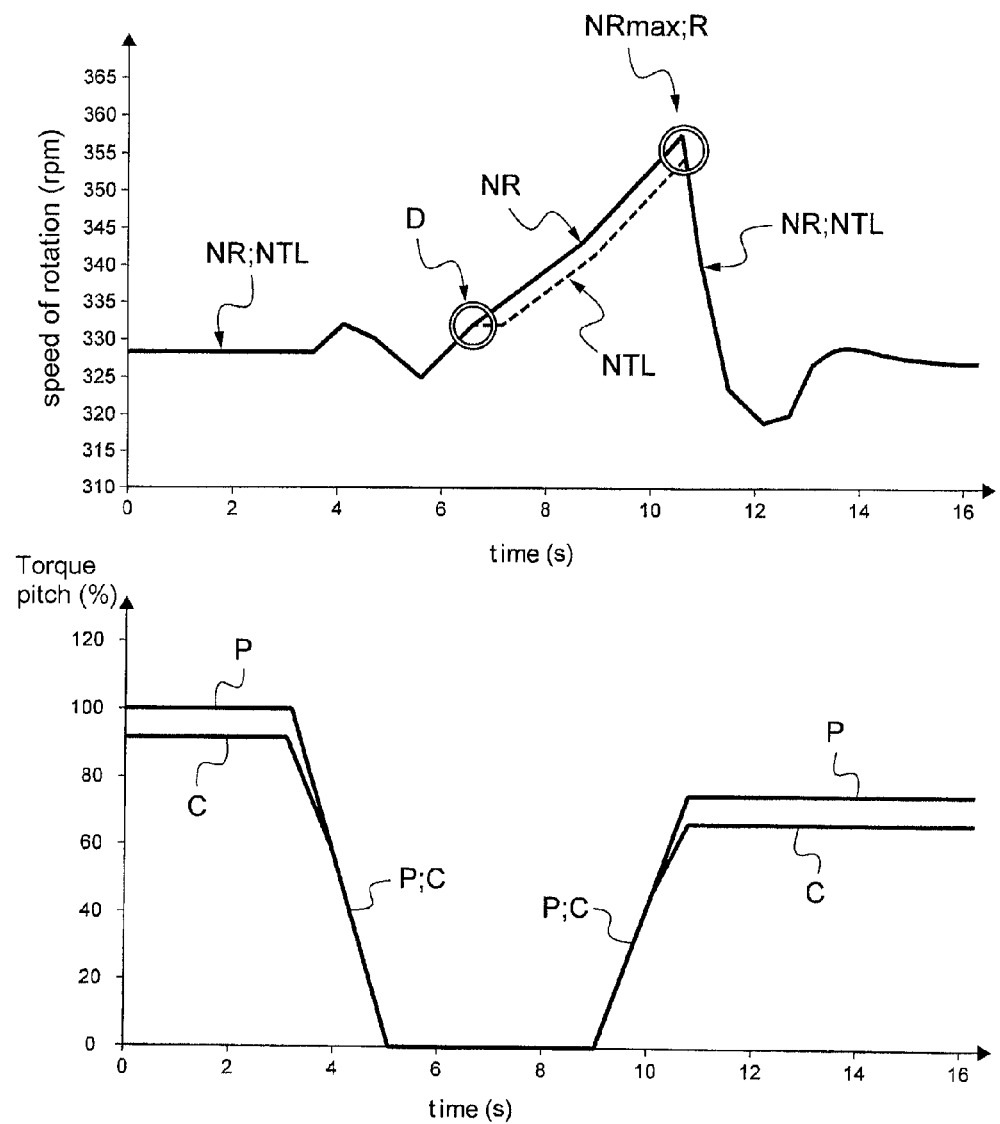
FIG. 3 shows an example of how the speeds of rotation of a rotor and of a free turbine may vary in the method in accordance with the invention, as a function of the modification to the collective pitch.

This serves to obtain the speed curves of FIG. 3.

As an example, the method consists in using a constant d that preferably lies in the range 0.005 to 0.1, and more preferably is equal to 0.01. The constant d is determined experimentally or by calculation for each aircraft.

In a first implementation, the speed of the free turbine 3 is regulated on the basis of a first setpoint value NTL* equal to said regulation term NRc when said regulation term NRc is greater than said setpoint threshold NTL', and the speed of the free turbine is regulated on the basis of a first setpoint value NTL* equal to said setpoint threshold NTL' when the setpoint threshold NTL' is greater than said regulation term NRc.

In a second implementation, if the third speed of rotation NR is less than the sum of the first speed of rotation NTL of the free turbine plus a first predetermined invariant X1, and if the time derivative of the third speed of rotation NR is greater than a second invariant X2, then the speed of the free turbine is regulated on a first setpoint value NTL* equal to said regulation term NRc. Otherwise, the speed of the free turbine is regulated on the basis of a first setpoint value NTL* equal to said setpoint threshold NTL'.

The first and second invariants are determined by the manufacturer by testing.

The speed of the free turbine is regulated by tracking the variation in the third speed of rotation NR of the main rotor 6, and resynchronization takes place at a speed of rotation NR that is faster than when using regulation as known in the prior art. The engine is thus able to counter the deceleration of the rotor more quickly, with the third speed of rotation dropping to a speed of only 320 rpm instead of 315 rpm.

FIG. 3 illustrates an example of how the third speed of rotation NR of the main rotor 6 and the first speed of rotation NTL of the free turbine 3 vary in the method in accordance with the invention as a function of a modification to the collective pitch P.

Figure 4:
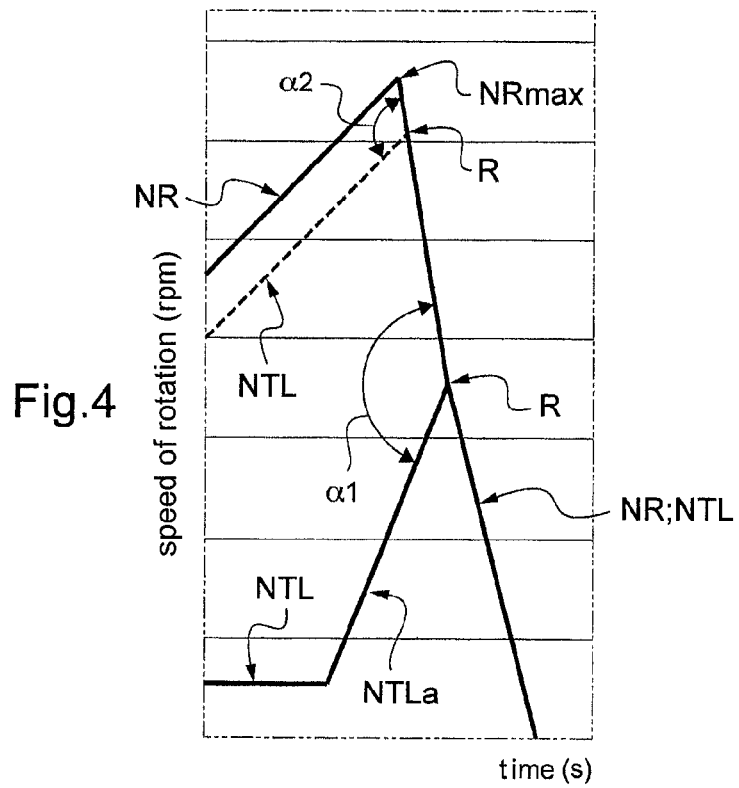
FIG. 4 is an enlargement of a portion of the graphs of FIGS. 2 and 3.

FIG. 4 is an enlargement of a portion of the graph of FIGS. 2 and 3.

This figure clearly shows an angle difference measured between the speeds of rotation of the rotor NR and of the free turbine NTL concerning FIGS. 2 and 3 at the resynchronization point R.

The angle α1 of FIG. 2 is substantially greater than the angle α2 of FIG. 3, thereby giving rise to a difference in acceleration of a kind that is more likely to generate an impact in the free-wheel 4. This phenomenon is substantially diminished when the acceleration difference is made smaller, as happens with the method in accordance with the invention.

Figure 5:
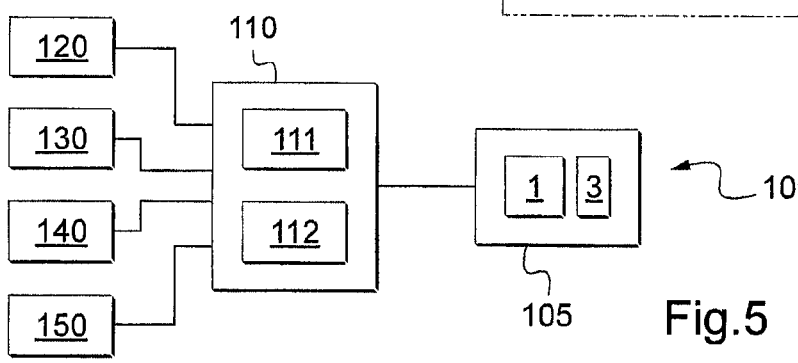
FIG. 5 is a block diagram of a device for regulating a power plant of a rotary wing aircraft.

FIG. 5 shows a regulator device 100 for regulating a power plant 105 of a rotary wing aircraft, the power plant 105 having a gas generator 1 and a free turbine 3.

The regulator device 100 comprises a computer 110 having processor 111 and a memory 112 containing instructions. Furthermore, the device 100 includes first measurement means 120 for measuring a current first speed of rotation NTL of the free turbine 3, second measurement means 130 for measuring a current second speed of rotation NG of the gas generator 1, a measurement member 140 for measuring the third speed of rotation NR of a main rotor of the aircraft, and a position sensor 150 for sensing a controlled position of said collective pitch.

The instructions stored in the memory 112 enable the processor 111 to perform the following operations:

the processor 111 uses the measured value of the first speed of rotation NTL to cause this first speed of rotation NTL to tend towards a first setpoint value NTL* by controlling a second speed of rotation NG of the gas generator by means of a second setpoint value NG*;

the processor 111 determines how the collective pitch of the blades of the rotary wing is varying, and as a function of said variation, the processor temporarily anticipates the power demand of the rotary wing by correcting the second setpoint value NG*;

the processor 111 determines the current value of the third speed of rotation NR of the rotary wing using the measurement member 140;

the processor 111 calculates a regulation term that is a function of the third speed of rotation by using the following relationship:

$$NRc = NR*(1-d)$$

where "NRc" represents said regulation term, "NR" represents said third speed of rotation, and "d" represents a constant lying in the range 0 to 1;

the processor 111 compares the values of said regulation term and of a predetermined setpoint threshold NTL' of the first speed of rotation NTL of the free turbine; and the processor 111 regulates the first speed of rotation NTL of the free turbine 3 by using a first setpoint value NTL* that is equal either to said regulation term NRc or else to said setpoint threshold NTL', as a function of predetermined conditions.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of regulating a power plant having a gas generator and a free turbine in a rotary wing aircraft, the method comprising:
    using a measured value of a first speed of rotation (NTL) of the free turbine to cause the first speed of rotation (NTL) to tend towards a first setpoint value (NTL*) by controlling a second speed of rotation (NG) of said gas generator by a second setpoint value (NG*);
    monitoring variation in a collective pitch of blades of the rotary wing and, as a function of said variation, temporarily anticipating a power demand of the rotary wing by correcting the second setpoint value (NG*);
    reading a current value of a third speed of rotation (NR) of the rotary wing to calculate a regulation term (NRc) that is a function of the third speed of rotation (NR) by using the following relationship:

$$NRc=NR*(1-d)$$

where "NRc" represents said regulation term, "NR" represents said third speed of rotation, and "d" represents a non-zero constant lying in the range 0 to 1;
    comparing the values of the regulation term (NRc) with a predetermined setpoint threshold (NTL') of the first speed of rotation (NTL) of the free turbine; and
    regulating the first speed of rotation (NTL) of the free turbine on a first setpoint value (NTL*) equal either to said regulation term (NRc) or to said setpoint threshold (NTL'), as a function of predetermined conditions.

2. A method according to claim 1, wherein the method compare the values of the regulation term (NRc) with the setpoint threshold (NTL') provides for using a constant (d) lying in the range 0.005 to 0.1.

3. A method according to claim 2, wherein the method provides for using a constant (d) equal to 0.01.

4. A method according to claim 1, wherein the first speed of rotation (NTL) of the free turbine is regulated on a first setpoint value (NTL*) equal to said regulation term (NRc) when the regulation term (NRc) is greater than said setpoint threshold (NTL'), and the first speed of rotation (NTL) is regulated on a first setpoint value (NTL*) equal to said setpoint threshold (NTL') when the setpoint threshold is greater than said regulation term (NRc).

5. A regulation method according to claim 1, wherein if the third speed of rotation (NR) of the rotary wing is less than the sum of the first speed of rotation (NTL) of the free turbine plus a first predetermined invariant, and if the time derivative of the third speed of rotation (NR) is greater than a second invariant, then the first speed of rotation (NTL) is regulated on a first setpoint value (NTL*) equal to said regulation term (NRc), otherwise the first speed of rotation (NTL) is regulated on a first setpoint value (NTL*) equal to the setpoint threshold (NTL').

6. A method according to claim 1, wherein the second setpoint value (NG*) is determined by proportional integral regulation.

7. A method according to claim 1, wherein the method provides for using a computer of the power plant to implement its constituent steps.

8. A method according to claim 1, wherein the method provides for using a computer of the avionics system of the aircraft.

9. A method according to claim 1, wherein the power plant is connected to the rotary wing via a main gearbox (MGB) and a free-wheel mechanism.

10. A regulator device for regulating a power plant of a rotary wing aircraft, the power plant being provided with a gas generator and a free turbine, said regulator device comprising a computer provided with a processor and a memory containing instructions, the instructions enabling the processor to perform the following operations:
    using a measured value of a first speed of rotation (NTL) of the free turbine to cause the first speed of rotation (NTL) to tend towards a first setpoint value (NTL*) by controlling a second speed of rotation (NG) of the gas generator by a second setpoint value (NG*);
    determining how much a collective pitch of blades of the rotary wing is varying, and as a function of said variation, temporarily anticipating a power demand of the rotary wing by correcting the second setpoint value (NG*);
    determining a current value of a third speed of rotation (NR) of the rotary wing;
    calculating a regulation term (NRc) that is a function of the third speed of rotation (NR) by using the following relationship:

$$NRc=NR*(1-d)$$

where "NRc" represents said regulation term, "NR" represents said third speed of rotation, and "d" represents a non-zero constant lying in the range 0 to 1;
    comparing the values of said regulation term (NRc) and of a predetermined setpoint threshold (NTL') of the first speed of rotation (NTL) of the free turbine; and
    regulating the first speed of rotation (NTL) of the free turbine on a first setpoint value (NTL*) that is equal either to said regulation term (NRc) or else to said setpoint threshold (NTL'), as a function of predetermined conditions.

11. An aircraft comprising:
    a rotary wing having a rotor and a plurality of blades;
    an engine configured to drive the rotor, the engine having a gas generator and a free turbine; and
    a controller for regulating the engine, the controller configured to:
        use a measured value of a first speed of rotation (NTL) of the free turbine to cause the first speed of rotation (NTL) to tend towards a first setpoint value (NTL*) by controlling a second speed of rotation (NG) of the gas generator by a second setpoint value (NG*);
        monitor variation in a collective pitch of the blades of the rotary wing and, as a function of the variation, temporarily anticipating a power demand of the rotary wing by correcting the second setpoint value (NG*);
        read a current value of a third speed of rotation (NR) of the rotor to calculate a regulation term (NRc) that is a function of the third speed of rotation (NR) by using the following relationship:

$$NRc=NR*(1-d)$$

where "NRc" represents said regulation term, "NR" represents said third speed of rotation, and "d" represents a non-zero constant lying in the range 0 to 1; and regulate the first speed of rotation (NTL) of the free turbine on a first setpoint value (NTL*) equal either to the regulation term (NRc) or to a predetermined setpoint threshold (NTL') of the first speed of rotation (NTL) of the free turbine, as a function of predetermined conditions.

12. The aircraft of claim 11 wherein:
the controller is further configured to compare the values of the regulation term (NRc) with the setpoint threshold (NTL') and to regulate the first speed of rotation (NTL) of the free turbine on a first setpoint value (NTL*) equal to the regulation term (NRc) when the regulation term (NRc) is greater than the setpoint threshold (NTL').

13. The aircraft of claim 11 wherein:
the controller is further configured to compare the values of the regulation term (NRc) with the setpoint threshold (NTL') and to regulate the first speed of rotation (NTL) of the free turbine on a first setpoint value (NTL*) equal to the setpoint threshold (NTL') when the setpoint threshold is greater than the regulation term (NRc).

14. The aircraft of claim 11 wherein:
the controller is further configured to regulate the first speed of rotation (NTL) of the free turbine on a first setpoint value (NTL*) equal to the regulation term (NRc) if the third speed of rotation (NR) of the rotor is less than the sum of the first speed of rotation (NTL) plus a first predetermined invariant and if the time derivative of the third speed of rotation (NR) is greater than a second invariant.

15. The aircraft of claim 14 wherein:
the controller is further configured to regulate the first speed of rotation (NTL) of the free turbine on a first setpoint value (NTL*) equal to the setpoint threshold (NTL') if either the third speed of rotation (NR) of the rotor is greater than the sum of the first speed of rotation (NTL) plus a first predetermined invariant or if the time derivative of the third speed of rotation (NR) is less than a second invariant.

* * * * *